(12) United States Patent
Withers et al.

(10) Patent No.: US 7,828,317 B2
(45) Date of Patent: Nov. 9, 2010

(54) INTEGRATED SUPPORT STRUCTURE FOR EITHER A FIFTH WHEEL HITCH OR A GOOSENECK TRAILER HITCH

(75) Inventors: Sean Withers, Monroe, MI (US); Harry Erle Rawlins, Dearborn, MI (US); Jeffrey A. Walesch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 12/183,810

(22) Filed: Jul. 31, 2008

(65) Prior Publication Data

US 2009/0295122 A1    Dec. 3, 2009

Related U.S. Application Data

(60) Provisional application No. 61/057,376, filed on May 30, 2008.

(51) Int. Cl.
*B60F 1/00* (2006.01)

(52) U.S. Cl. .................. 280/425.2; 280/496

(58) Field of Classification Search ............. 280/476.1, 280/415.1, 417.1, 425.2, 495, 496, 491.5
See application file for complete search history.

(56) References Cited

U.S. PATENT DOCUMENTS

| | | | | |
|---|---|---|---|---|
| 2,402,254 | A | | 6/1946 | Maddock et al. |
| 2,647,761 | A | * | 8/1953 | Kentz ...................... 280/446.1 |
| 3,336,050 | A | | 8/1967 | Dale |
| 3,336,051 | A | | 8/1967 | Dale |
| 3,390,896 | A | | 7/1968 | Philaphy |
| 3,527,476 | A | | 9/1970 | Winckler |
| 4,256,323 | A | * | 3/1981 | McBride .................. 280/423.1 |
| 4,546,994 | A | | 10/1985 | Taylor |
| 4,643,443 | A | | 2/1987 | Husa |
| 5,143,393 | A | | 9/1992 | Meyer |
| 5,513,869 | A | * | 5/1996 | Putnam .................... 280/415.1 |
| 5,529,329 | A | * | 6/1996 | McCoy ..................... 280/438.1 |
| 6,065,766 | A | * | 5/2000 | Pulliam .................... 280/415.1 |
| 6,158,761 | A | | 12/2000 | King |
| 6,357,777 | B1 | * | 3/2002 | Linger et al. ................. 280/441 |
| 6,447,000 | B1 | | 9/2002 | Dick et al. |
| 6,467,791 | B1 | | 10/2002 | Fandrich et al. |
| 6,502,846 | B2 | * | 1/2003 | Fandrich et al. .......... 280/491.5 |
| 6,520,528 | B2 | | 2/2003 | Fandrich et al. |
| 6,805,379 | B2 | | 10/2004 | Nommensen |
| D499,010 | S | | 11/2004 | Velten |
| D499,050 | S | | 11/2004 | Lindenman et al. |
| 6,824,157 | B1 | | 11/2004 | Putnam |
| 7,121,573 | B2 | * | 10/2006 | Lindenman et al. ......... 280/433 |
| 7,140,633 | B2 | | 11/2006 | Audo et al. |

(Continued)

*Primary Examiner*—Tony H. Winner
(74) *Attorney, Agent, or Firm*—Frederick Owens; Brooks Kushman P.C.

(57) ABSTRACT

An integrated support structure apparatus is provided for attaching either a fifth wheel trailer hitch or a gooseneck trailer hitch to a truck bed. The integrated support structure comprises an H-shaped body that is attached to at least one truck frame rail below the truck bed. A gooseneck ball receiver is attached to a central portion of the body and aligned with a gooseneck opening in the truck bed. A plurality of receptacles are attached to the body in an array and are aligned with a corresponding plurality of pedestal access openings in the truck bed.

20 Claims, 4 Drawing Sheets

U.S. PATENT DOCUMENTS

| | | |
|---|---|---|
| 7,147,420 B2 | 12/2006 | Baus et al. |
| 7,234,905 B2 * | 6/2007 | Warnock ..................... 410/80 |
| 7,261,311 B2 | 8/2007 | Lindenman et al. |
| 7,264,259 B2 | 9/2007 | Lindenman et al. |
| D596,921 S | 7/2009 | Hageman et al. |
| 2004/0021290 A1 | 2/2004 | Hicks et al. |
| 2009/0085326 A1 * | 4/2009 | Linger et al. ................ 280/433 |

* cited by examiner

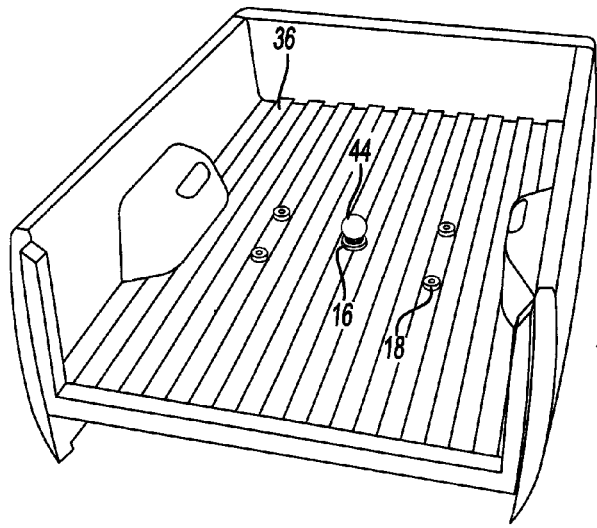
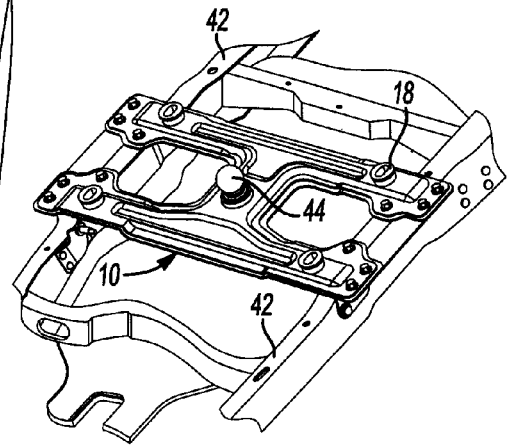
Fig-4  Fig-5
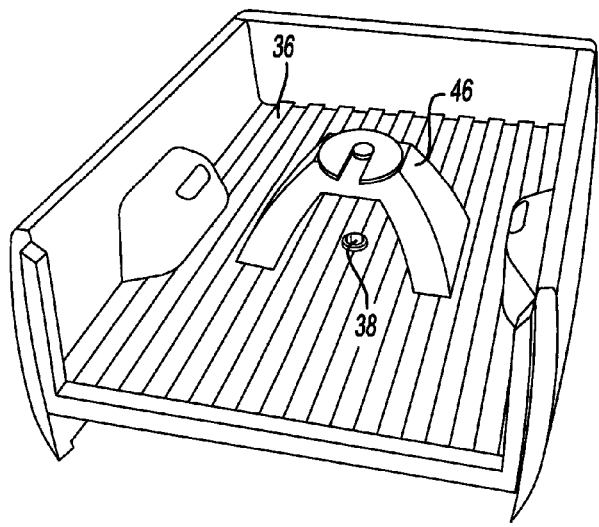
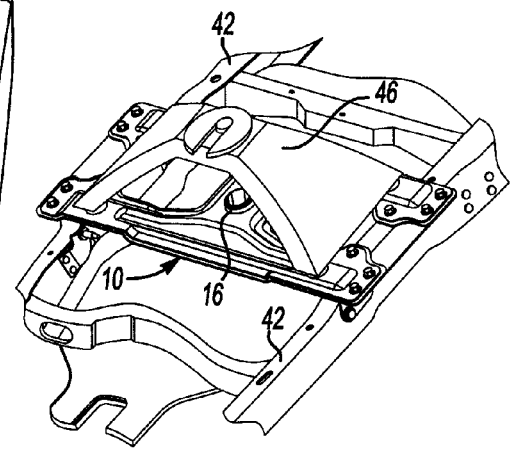
Fig-6  Fig-7

INTEGRATED SUPPORT STRUCTURE FOR EITHER A FIFTH WHEEL HITCH OR A GOOSENECK TRAILER HITCH

This application claims the benefit of U.S. provisional application Ser. No. 61/057,376 filed May 30, 2008.

BACKGROUND OF THE INVENTION

1. Field of the Invention

This invention is directed to a trailer hitch mounting structure for a pick-up truck that may receive a gooseneck hitch or a fifth wheel hitch. The gooseneck hitch and fifth wheel hitch may both be disassembled from the pick-up truck bed to allow for unobstructed use of the truck bed.

2. Background Art

Trucks may be used to pull a trailer with a frame mounted bumper hitch, a frame mounted fifth wheel hitch, or a frame mounted gooseneck hitch mounted in the pick-up bed. Fifth wheel and gooseneck hitches allow for larger trailers and provide considerably more stability than traditional bumper-pull hitches. Fifth wheel and gooseneck hitches are more stable because they are connected to the truck above the rear axle so that the added load of the trailer is applied to rear axle and the pivot of the trailer is at or slightly in front of the rear axle.

Gooseneck hitches are designed to receive a trailer on a ball that is connected to the frame of the pick-up truck. The ball is mounted low in the bed for stability. Some fifth wheel hitch mounts may provide an adapter for a gooseneck hitch to attach a trailer that has the gooseneck type trailer hitch. A gooseneck adapter on a fifth wheel mount raises the height of the gooseneck ball, and usually obstructs more of the pick-up bed.

There is a need for an integrated support structure that is disposed beneath the bed of a pick-up truck so that the bed of the truck is not obstructed and to which either a fifth wheel hitch or a gooseneck hitch can be easily assembled.

SUMMARY OF THE INVENTION

According to one aspect of the disclosed apparatus, an apparatus is provided for attaching either a fifth wheel trailer hitch or a gooseneck trailer hitch to a truck bed. The apparatus includes a body attached to truck frame rails below the truck bed. A gooseneck ball receiver is attached to a central portion of the body and is aligned with a gooseneck opening in the truck bed. A plurality of pucks, or receptacles, are attached to the body in a symmetrical array and are aligned with a corresponding plurality of pedestal access openings in the truck bed.

According to another aspect of the disclosed apparatus, an integrated support structure is provided for hitching a trailer to a truck bed. The support structure comprises the body that is attached below the truck bed. A mechanism is provided for selectively securing a gooseneck trailer hitch to the body. In addition, means are provided for selectively securing a fifth wheel receiver pedestal to the truck bed. Depending upon the type of trailer hitch, it may be hitched to either the means for securing the gooseneck trailer hitch or the means for selectively securing a fifth wheel receiver pedestal to the truck bed.

According to other features of the disclosed apparatus, the means for selectively securing a gooseneck trailer hitch to the body may be a gooseneck ball receiver that is attached to the body. The means for selectively securing a fifth wheel receiver pedestal to the truck bed may be a plurality of pucks that are attached to the body.

According to still further features of the disclosed apparatus, a fifth wheel pedestal may be provided that is selectively attached to the plurality of pucks through the pedestal access openings. The truck bed is unobstructed when the fifth wheel pedestal is not attached to the plurality of pucks. The body may be generally H-shaped and each of the pucks may be attached to one of the ends of H-shaped body portion. The gooseneck ball receiver may be attached to the cross bar of the H-shaped body portion. The center of the gooseneck ball receiver is preferably disposed forward of a rear axle that is located below the truck bed. The center of the array of pucks may be disposed forward of the rear axle that is below the truck bed. First and second attachment plates are attached to opposite lateral ends of the body and are also attached to the at least one frame rail. More specifically, the H-shaped body portion may have a front transverse bar portion and a rear transverse bar portion that are interconnected by the central portion of the body. Two pucks are assembled to the front transverse bar portion and two pucks are assembled to the rear transverse bar portion.

These and other aspects of the disclosed apparatus will be better understood with reference to the attached drawings and the following detailed description of the illustrated embodiment.

BRIEF DESCRIPTION OF THE DRAWINGS

FIG. 4 is a rear perspective view of a pickup truck bed as shown in FIG. 2 that also includes a gooseneck hitch ball;

FIG. 5 is a rear perspective view of a truck frame that is provided with the support structure and a gooseneck hitch ball;

FIG. 6 is a rear perspective view of a pickup truck bed as shown in FIG. 2 that also includes a fifth wheel hitch structure installed;

FIG. 7 is a rear perspective view of a truck frame that is provided with the support structure and a fifth wheel hitch structure installed;

DETAILED DESCRIPTION OF THE PREFERRED EMBODIMENT(S)

Figure 1:
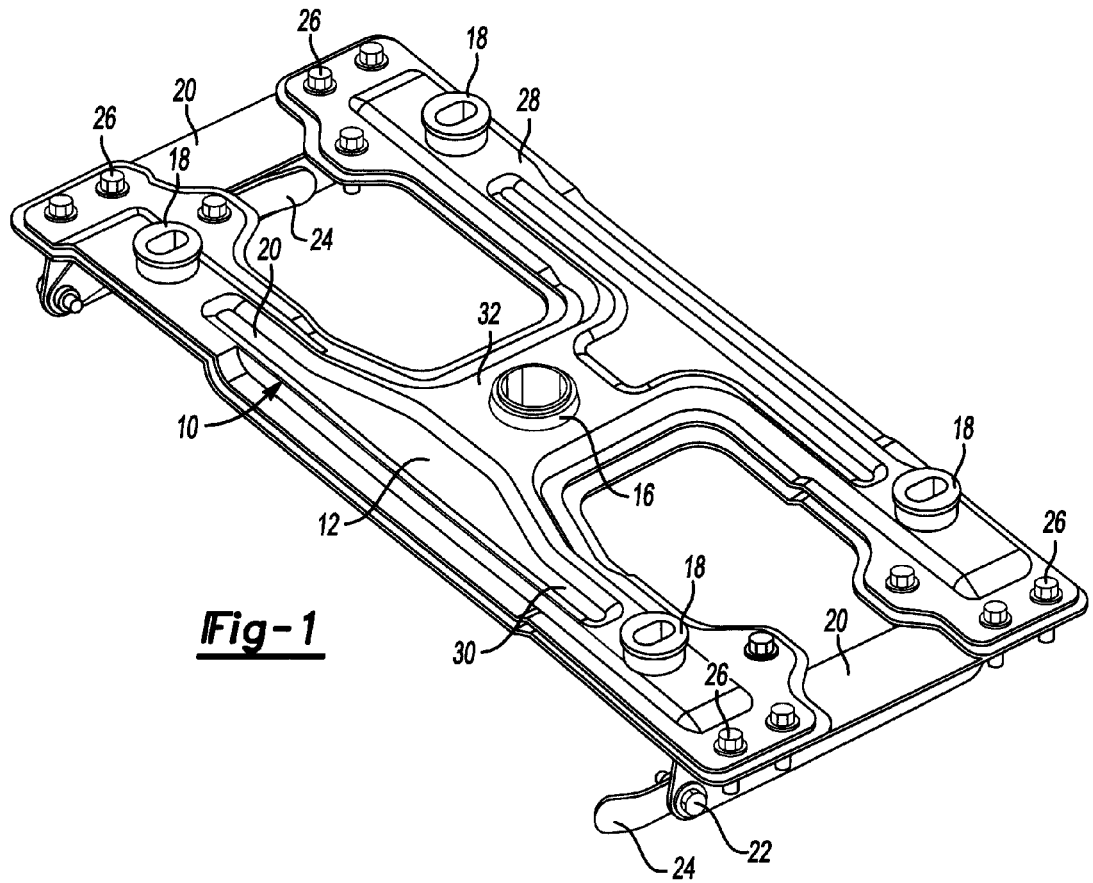
FIG. 1 is a perspective view of an integrated support structure for either a fifth wheel hitch or a gooseneck trailer hitch shown with pucks installed.

Referring to FIG. 1, an integrated support structure 10 for either a fifth wheel hitch or a gooseneck trailer hitch(hereinafter the support structure assembly 10) is illustrated in isolation from the vehicle. The support structure assembly 10 includes a H-shaped body portion 12. The H-shaped body portion 12 may be fabricated in one piece or may also be fabricated as a layered two-piece structure. A gooseneck ball receiver 16 is shown assembled to the body portion 12 at a central location on the body portion 12. The gooseneck ball receiver 16 comprises a quick connect receptacle. Four fifth wheel pucks 18 are shown attached to the top surface of the body portion 12. Right and left side attachment plates 20 are attached to opposite lateral ends of the body portion 12. The side attachment plates are provided to connect the support structure assembly 10 to a vehicle frame with bolts 22 and flag nuts 24. The flag nuts 24 are prevented from rotating by the frame to facilitate fastening the bolts 22. Additional fasteners 26 are provided to secure the body portion 12 to the side attachment plates 20 and to nut plates (not shown).

The H-shaped body portion 12 includes a front transverse bar portion 28 and a rear transverse bar portion 30. A central bridging portion 32 is provided between the front and rear transverse bar portions 28, 30.

Figure 2:
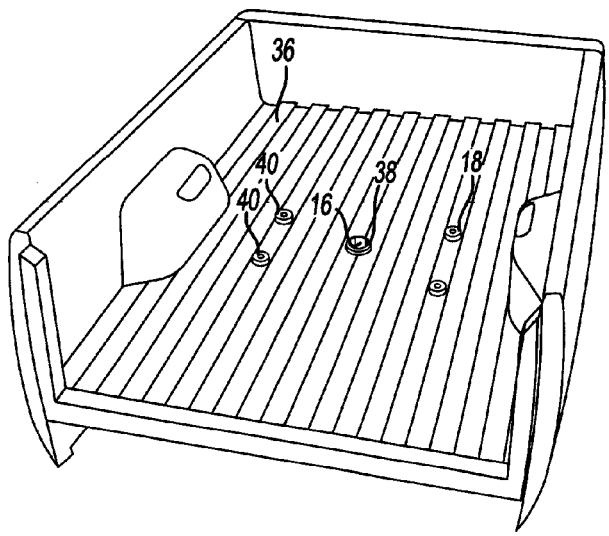
FIG. 2 is a rear perspective view of a pickup truck bed provided with the support structure shown in FIG. 1.
Figure 3:
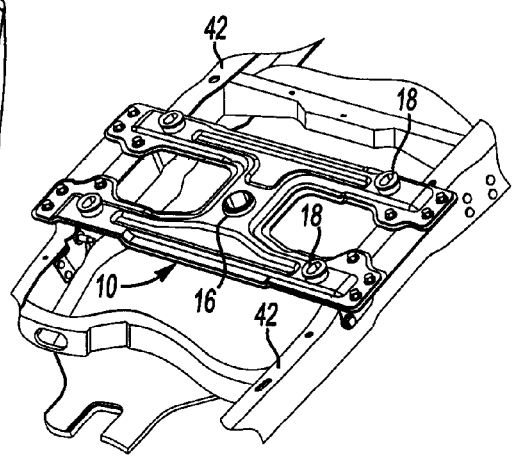
FIG. 3 is a rear perspective view of a truck frame that is provided with the support structure shown in FIG. 1.

Referring to FIGS. 2 and 3, a pickup truck bed 36 is shown to include a gooseneck access opening 38 and four fifth wheel puck access openings 40. As shown in FIG. 3, the support structure assembly 10 is shown attached to the truck bed frame rails 42. The gooseneck ball receiver 16 and the fifth wheel pucks 18 extend upwardly from the support structure assembly 10 and are aligned with the gooseneck access openings 38 and fifth wheel puck access openings 40 in the pickup truck bed 36, respectively, as shown in FIG. 2.

Referring to FIGS. 4 and 5, the pickup truck bed 36 is shown with a gooseneck quick connect receiver ball 44 assembled to the gooseneck ball receiver 16. The fifth wheel pucks 18 may be used to secure the safety chains of the trailer to the bed of the truck when the trailer is assembled to the gooseneck quick connect receiver ball 44. As shown in FIG. 5, the support structure assembly 10 is secured to the frame rails 42. The gooseneck quick connect receiver ball 44 and the fifth wheel pucks 18 are shown assembled to the support structure assembly 10.

Referring to FIGS. 6 and 7, the pickup truck bed 36 is shown with a fifth wheel receiver pedestal 46 assembled to the support structure 10. The fifth wheel receiver pedestal 46 includes quarter turn locking pins that lock the pedestal 46 to the fifth wheel pucks 18. The quarter turn locking pins lock the fifth wheel receiver pedestal 46 to the support structure 10.

The gooseneck ball 44 incorporates a locking mechanism that secures the hitch structure of the trailer to the truck. The gooseneck ball locking mechanism provides tamper resistance when the trailer is connected to the truck. The center of the gooseneck ball is preferably located approximately 76 mm (3 inches) forward of the rear axle. The center of the four fifth wheel pucks 18 is approximately 55 mm (2.17 inches) forward of the rear axle.

The entire support structure assembly 10 is assembled below the pickup truck bed 36 and is attached to the frame rails 42. As shown in FIG. 7, the fifth wheel receiver pedestal 46 is shown assembled to the support structure assembly 10. It should be understood that the frame rail 42 and the support structure assembly 10 are disposed below the pickup truck bed 36. The fifth wheel receiver pedestal 46 is assembled to the support structure assembly 10 through the fifth wheel puck access openings 40 and is locked in place by means of the quarter turn locking pins.

Figure 8:
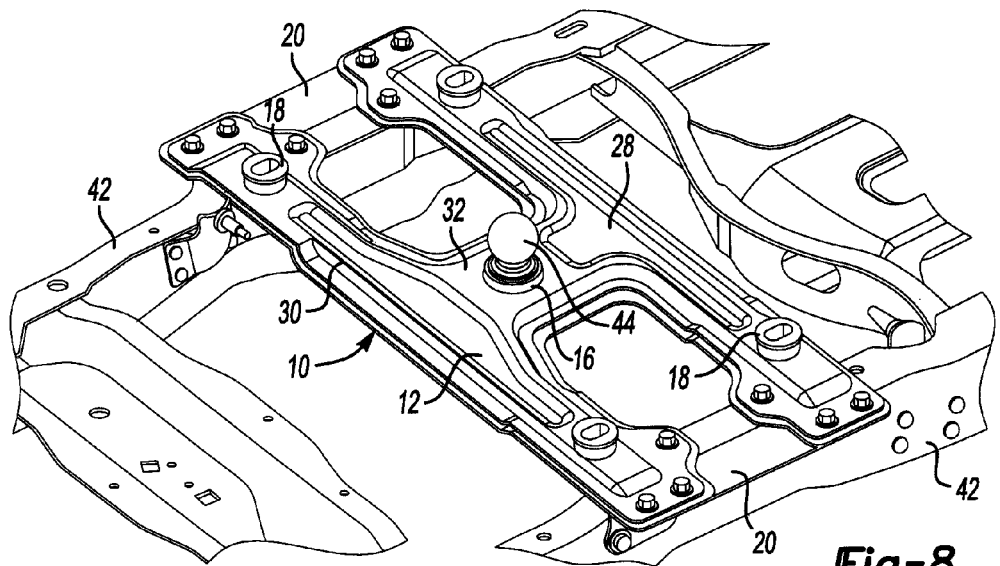
FIG. 8 is a perspective view of the integrated support structure for either a fifth wheel hitch or a gooseneck trailer hitch shown assembled to the frame of a pickup truck bed.

Referring to FIG. 8, the support structure assembly 10 is shown secured to the truck bed frame rails 42. As shown in FIG. 8, the gooseneck quick connect receiver ball 44 is shown assembled to the gooseneck ball receiver 16. The gooseneck ball receiver 16 is disposed in the central bridging portion 32 between the front transverse bar portion 28 and the rear transverse bar portion 30. The fifth wheel pucks 18 are shown assembled to the support structure assembly 10. The side attachment plates 20 secure the opposite lateral ends of the support structure assembly 10 to the frame rails 42 as previously described.

Figure 9:
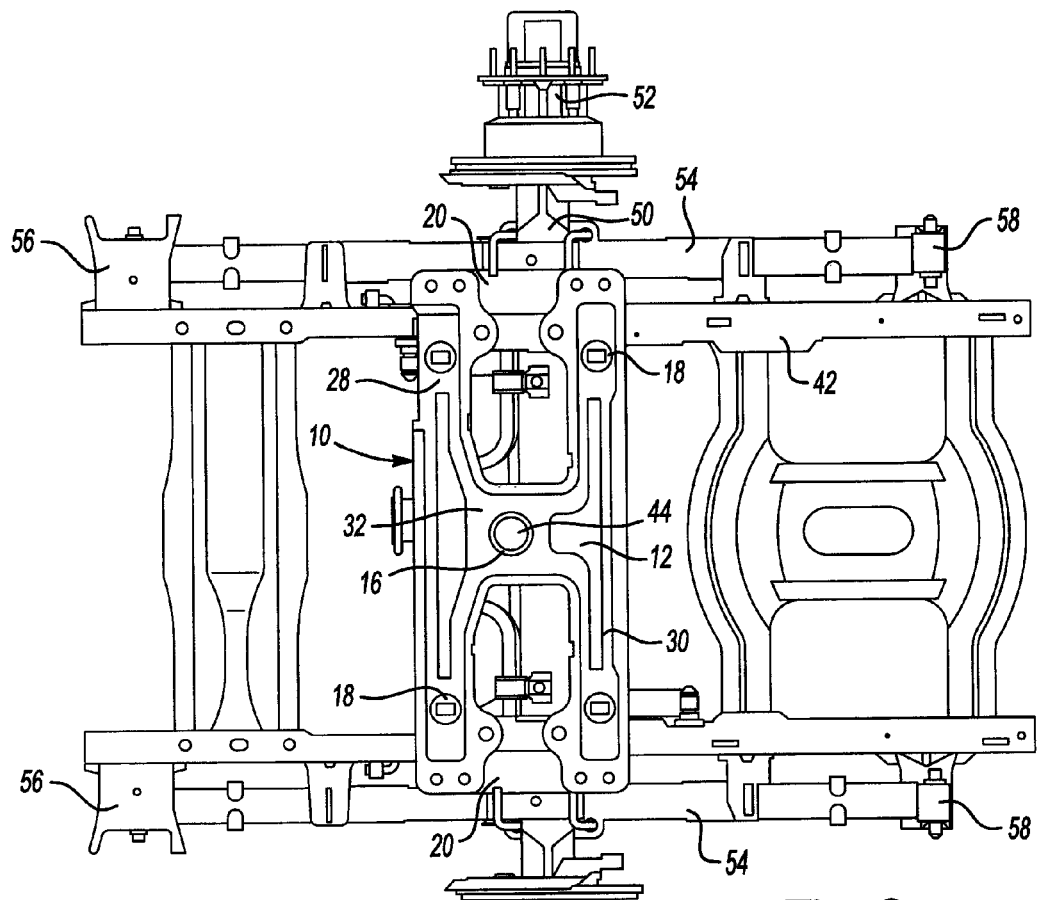
FIG. 9 is a plan view of a pickup truck bed that has the integrated support structure for either a fifth wheel hitch or a gooseneck trailer hitch shown assembled to a pickup truck bed frame.

Referring to FIG. 9, the support structure assembly 10 is shown in a plan view as it is attached to the top surface of the truck frame rails 42. The support structure assembly 10 is located over the rear axle 50 with the quick connect receiver ball 44 being located forward of the axle center line 50. The pucks 18 are shown with the center of the four pucks being approximately 55 mm forward of the central axis of the rear axle 50.

Figure 10:
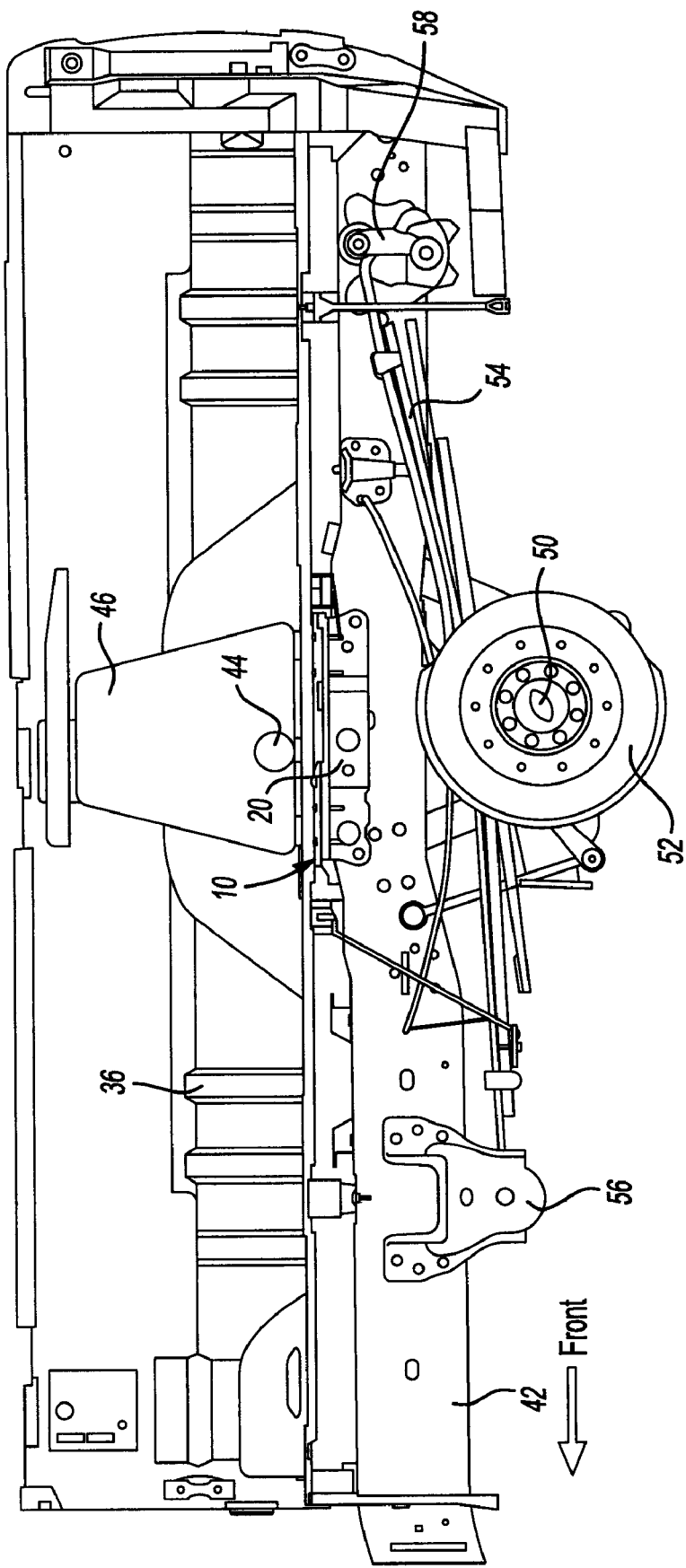
FIG. 10 is a side elevation view of a pickup truck bed that has the integrated support structure for either a fifth wheel hitch or a gooseneck trailer hitch showing both types of hitches attached to the support structure.

Referring to FIGS. 9 and 10, a rear wheel brake rotor 52 is shown assembled to the rear axle 50. The truck bed 36 is supported on frame rail 42. In FIG. 10, both the gooseneck quick connect receiver ball 44 and the fifth wheel receiver pedestal 46 are shown assembled to the support structure assembly 10. It should be understood that generally only one of the receiver pedestal 46 or quick connect receiver ball 44 would be assembled to the support structure 10 so that either a fifth wheel trailer or gooseneck trailer could be towed by the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for attaching both a fifth wheel trailer hitch and a gooseneck trailer hitch to a truck bed comprising:
    a body attached to at least one truck frame rail below the truck bed;
    a gooseneck ball receiver attached to a central portion of the body and aligned with a gooseneck opening in the truck bed; and
    a plurality of receptacles attached to the body in an array and aligned below a corresponding plurality of pedestal access openings in the truck bed.

2. The apparatus of claim 1 further comprising a fifth wheel pedestal that is selectively attached to the plurality of receptacles through the pedestal access openings, wherein the truck bed is unobstructed when the fifth wheel pedestal is not attached to the plurality of pucks.

3. The apparatus of claim 1 wherein the plurality of receptacles are disposed laterally outboard of the central portion.

4. The apparatus of claim 1 wherein the body is generally H-shaped and wherein the gooseneck ball receiver is attached to the cross bar of the H-shaped body portion.

5. The apparatus of claim 1 wherein the gooseneck ball receiver is a quick connect receptacle.

6. The apparatus of claim 1 further comprising a fifth wheel pedestal that is selectively attached to the plurality of receptacles through the pedestal access openings.

7. The apparatus of claim 1 wherein the center of the gooseneck ball receiver is disposed forward of a rear axle that is below the truck bed.

8. The apparatus of claim 1 wherein the fore and aft center of the array of receptacles is disposed forward of a rear axle that is below the truck bed.

9. The apparatus of claim 1 further comprising first and second attachment plates attached to opposite lateral ends of the body and are attached to at least one frame rail.

10. The apparatus of claim 1 wherein the body has a front transverse bar portion and a rear transverse bar portion that are interconnected by the central portion of the body, wherein two receptacles are assembled to the front transverse bar portion and two receptacles are assembled to the rear transverse bar portion.

11. An integrated support structure for hitching a trailer to a truck bed comprising:
   a body attached below the truck bed;
   means for selectively securing a gooseneck trailer hitch to the body;
   means for selectively securing a fifth wheel receiver pedestal to the body; and
   wherein the trailer is hitched to either the means for selectively securing a gooseneck trailer hitch or the means for selectively securing a fifth wheel receiver pedestal to the body below the truck bed.

12. The integrated support structure of claim 11 wherein the means for selectively securing a gooseneck trailer hitch to the body is a gooseneck ball receiver that is attached to the body.

13. The integrated support structure of claim 11 wherein the means for selectively securing a fifth wheel receiver pedestal to the truck bed is a plurality of pucks that are attached to the body.

14. The integrated support structure of claim 13 further comprising a fifth wheel pedestal that is selectively attached to the plurality of pucks through corresponding pedestal access openings.

15. The integrated support structure of claim 11 wherein the body is generally H-shaped and wherein each of the pucks is attached to one of the ends of the H-shaped body portion.

16. The integrated support structure of claim 11 wherein the body is generally H-shaped and wherein the gooseneck ball receiver is attached to the cross bar of the H-shaped body portion.

17. The integrated support structure of claim 11 wherein the means for selectively securing a gooseneck trailer hitch to the body is disposed forward of a rear axle that is below the truck bed.

18. The integrated support structure of claim 11 wherein the means for selectively securing a fifth wheel receiver pedestal to the truck bed is disposed forward of a rear axle that is below the truck bed.

19. The apparatus of claim 11 further comprising first and second attachment plates attached to opposite lateral ends of the body and are attached to at least one frame rail below the truck bed.

20. The integrated support structure of claim 11 wherein the body has a front transverse bar portion and a rear transverse bar portion that are interconnected by the central portion of the body, wherein two pucks are assembled to the front transverse bar portion and two pucks are assembled to the rear transverse bar portion.

* * * * *